United States Patent [19]
Turzillo

[11] 3,780,975
[45] Dec. 25, 1973

[54] MEANS FOR PRODUCING CAST-IN-PLACE STRUCTURES IN SITU

[76] Inventor: Lee A. Turzillo, 2078 Glengary Rd., Akron, Ohio 44313

[22] Filed: Nov. 23, 1971

[21] Appl. No.: 203,103

[52] U.S. Cl............. 249/1, 61/54, 249/113, 249/134, 425/DIG. 36, 425/DIG. 126
[51] Int. Cl.............................................. E02d 5/60
[58] Field of Search................. 249/1, 113, 65, 134; 61/54, 53.62; 425/DIG. 36, DIG. 126

[56] References Cited
UNITED STATES PATENTS

| | | | |
|---|---|---|---|
| 3,397,260 | 8/1968 | Lamberton | 249/1 X |
| 1,447,407 | 3/1923 | Blumenthal | 61/54 X |
| 3,345,824 | 10/1967 | Turzillo | 61/53.62 X |
| 1,307,432 | 6/1919 | Aten | 249/1 X |
| 1,476,584 | 12/1923 | Beeby | 61/54 X |

*Primary Examiner*—H. A. Kilby, Jr.
*Attorney*—William Cleland

[57] ABSTRACT

Laminated sheet material, and apparatus utilizing the same, for producing and/or repairing structural bodies of self-hardening fluid cementitious material in a subaqueous and/or subterranian situs. Sheet material includes wire-mesh backing, and porous fabric bonded thereto, substantially without blocking of fabric pores, and is adapted for supplying in rolls or sheets to be cut and selectively formed at the situs into matrices or molds having body-forming cavities for producing or repairing concrete structures of many shapes and sizes.

The apparatus includes such laminated sheeting formed as a substantially rigid matrix, suitably reinforced and/or anchored at the situs to have porous fabric layers presented inwardly, to define matrix cavity walls backed by the openwork material. Fluid cementitious material supplied to the matrix cavity adapted to harden into structural body corresponding to shape of matrix cavity, after which matrix can be readily removed therefrom.

4 Claims, 10 Drawing Figures

PATENTED DEC 25 1973 3,780,975

MEANS FOR PRODUCING CAST-IN-PLACE STRUCTURES IN SITU

BACKGROUND OF INVENTION

In applicant's prior U. S. patent application, Ser. No. 44, there is disclosed methods and means for repairing or forming structural bodies of self-hardenable cementitious material. In the several forms of the invention disclosed in the prior application, however, wire mesh body-forming matrices were affixed at the situs and separate, performed porous-fabric containers were variously retained somewhat loosely within the matrix cavities to be fluid-expanded to distend the containers for smoothing out folds and/or wrinkles, before applying additional pressure to distend the container walls against wire mesh matrices and into the mesh openings thereof. Considerable effort and time was required for installing the fabric containers in the separately assembled matrices, as well as for obtaining requisite expansion of the container walls against the matrix walls.

SUMMARY OF INVENTION

This invention relates to body molding matrices and a laminated sheet material used for producing the same, as for making and/or repairing concrete structures in situ. The new laminated material is particularly useful in this regard for producing concrete bodies of the types generally represented and described in the aforesaid U. S. application, Ser. No. 44.

The laminated material of the present invention includes a backing of openwork sheet material such as rigid but, for certain purposes, flexible wire-mesh sheeting which can be forcibly flexed, rolled, or bent to various shapes at a situs; and a layer of porous fabric tenaceously or permanently bonded to the openwork material to have a major area of the fabric exposed through the openings of the backing without blocking the pores of the exposed areas. The laminated material is adapted to be produced in rolls thereof in various widths and sizes, and well suited as for cutting into sheets of various sizes and shapes for making body-forming matrices to have predetermined shapes and configurations, at a given situs, with the fabric layers presented inwardly as body-forming cavity walls. Fluid hydraulic cement mortar may be pumped into any such body-forming matrix cavity to fill the same to the full shape of the matrix cavity. Injection of flowable mortar under pressure into a closed matrix cavity, for example, may be continued until only a small fraction of flowable mortar oozes through the porous fabric areas exposed through the wire-mesh openings, as visible indication that the poured mortar forming the molded structural body, has acquired requisite reduction of the water-cement ratio thereof and, therefore, also indicating that no further addition of fluid mortar within the matrix is required. The flowable mortar forming the required structural body within the matrix may then be permitted to solidify in pressure contact with the porous fabric wall against the fixed wire-mesh backing material. When the mortar hardening period has been completed to a requisite degree the matrix may be removed from the resultant concrete body.

A general object of the present invention is to provide an improved method and means for more accurately and expeditiously producing concrete structures of predetermined accurate sizes and shapes in subaqueous or other situs.

Another object of the invention is to provide a new matrix forming material namely a lamination of porous fabric and a wire mesh reinforcement which can be furnished in flat sheets of given size, or in rolls to be cut into given sizes and shapes to be variously formed into substantially rigid, porous-walled matrices of predetermined shapes for producing concrete structures in situ.

Other objects of the invention will be manifest from the following brief description and the accompanying drawings.

Figure 1:
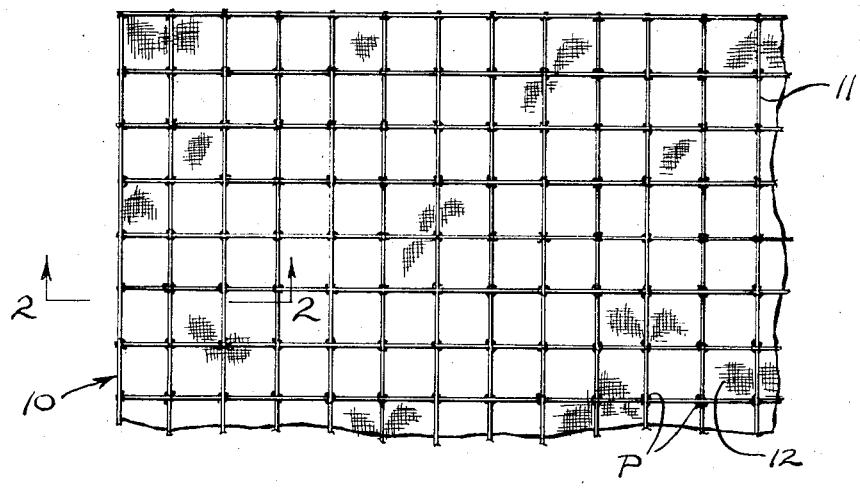
FIG. 1 is a flatwise view of a small area of the laminated sheet material of the invention.
Figure 2:
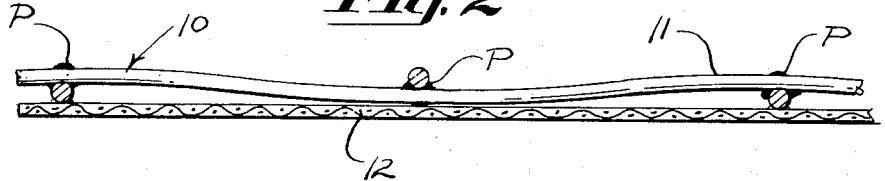
FIG. 2 is a cross-section, on a larger scale, taken on the line 2—2 of FIG. 1.

Referring to FIGS. 1 and 2 there is illustrated an improved laminated sheet material 10 of the invention, for use in providing improved matrices for molding concrete structures of types generally as represented in FIGS. 4, 6, 8, and 10, herein, and similar to types of structures disclosed in said prior U. S. patent application Ser. No. 44.

The sheet material 10 may be termed a reinforced porous laminate, and is adapted to be provided in flat sheets or in rolls, as for constructing hollow matrices of substantially unlimited given sizes and shapes, in situ or otherwise. For this purpose the sheet material 10 may be produced by laminating a relatively rigid but formable backing 11 of openwork sheet material, such as wire mesh sheeting from rolls thereof, and porous fabric 12 such as burlap, synthetic fiber, or other woven material from rolls thereof. As an example, wire mesh and porous fabric can be laminated by being continuously fed together toward suitable roll or roller means, while a strong contact cement in fluid form is sprayed between the two sheets, tenaciously to bond the same together substantially without closing the pores of the porous fabric.

Figure 5:
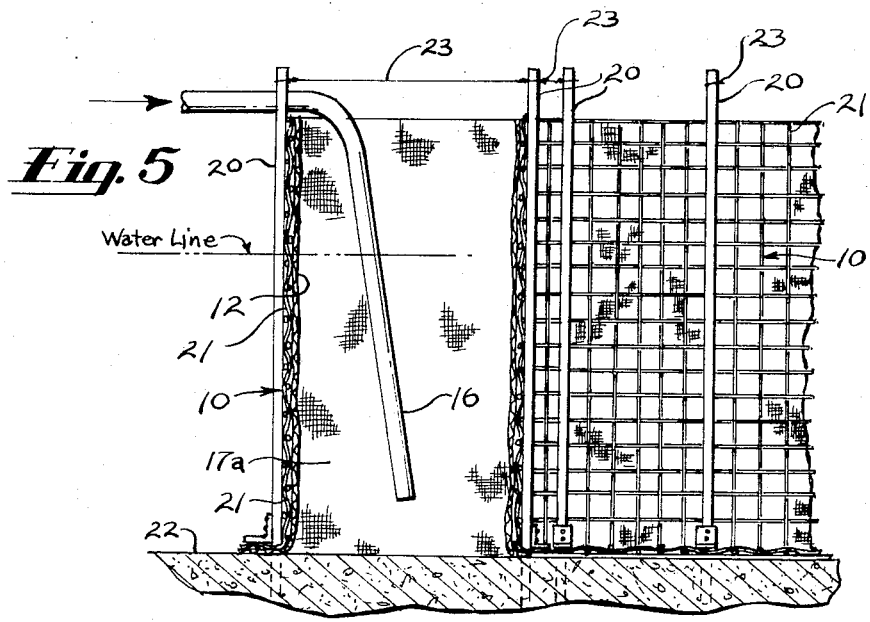
FIG. 5 is a vertical cross-section through an earth or like situs, illustrating use of the laminated material of FIGS. 1 and 2 to form a matrix having a fully formed porous-walled structure-forming cavity, as for producing a concrete breakwater.
Figure 6:
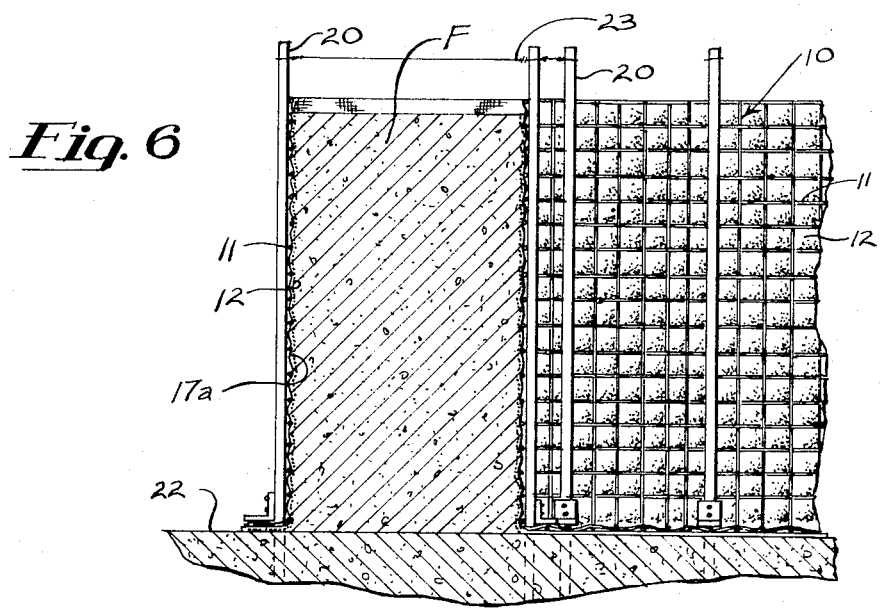
FIG. 6 is a view corresponding to FIG. 5, after pumping or feeding fluid cement mortar into the matrix cavity in accordance with the method of the invention.
Figure 7:
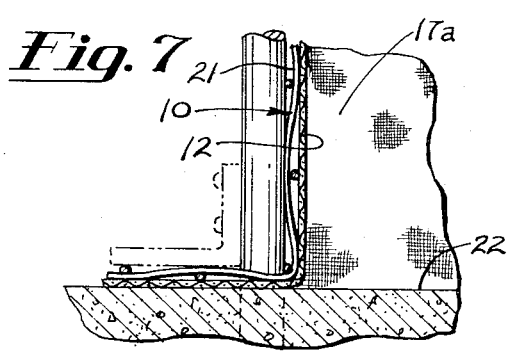
FIG. 7 is a fragmentary cross-section on an enlarged scale, taken at the lower left-hand corner of FIG. 5.

The wire mesh material 11 may be of square mesh type, having regularly spaced crossing weld points P which are permanently bonded to the fabric by any of the numerous types of adhesives presently available on the market. The wire mesh material may be of any mesh size and/or wire guage commensurate with the strength requirements, firstly as to ability to form the laminate into matrices of selective sizes and shapes at a situs, secondly as to the necessary rigidity of the formed matrices at the situs, and thirdly as to the ability of the wire mesh accurately to maintain the required shape of the porous fabric form under pressure of self-hardenable fluid cementitious mortar, for example, pumped or fed into the formed matrix cavity. On the other hand, the laminate may have wire mesh material of relatively light guage wire reinforced by bending into reinforcing flanges or joints in various ways (see FIGS. 3 and 4), and/or by attachment of reinforcing rods to the matrix walls at the situs, as shown in FIGS. 5 to 7.

Figure 3:
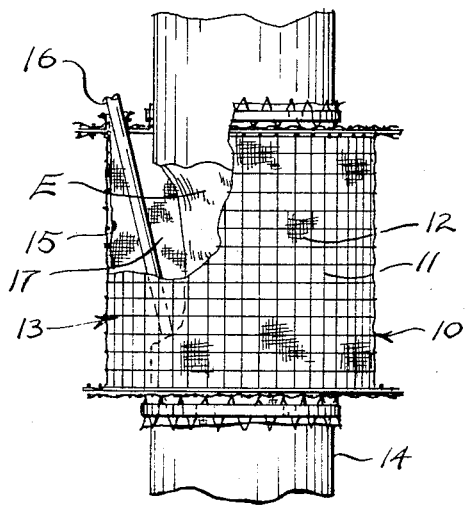
FIG. 3 is a front elevation, partly broken away and in section, illustrating use of the laminated porous sheet material of the invention to form a rigid matrix about an eroded portion of an existing bridge or like column, prior to feeding self-hardening cementitious repair material into the matrix.
Figure 4:
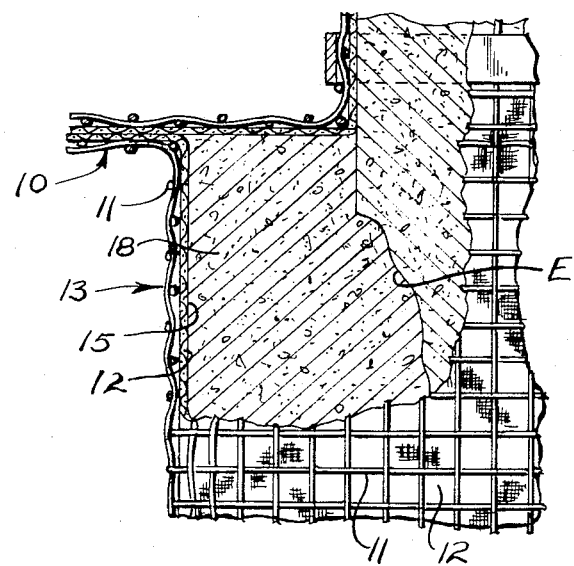
FIG. 4 is an enlarged fragmentary view of the upper left-hand portion of FIG. 3, but after cementitious material has been pumped into the matrix.

Reference is now made to FIGS. 3 and 4 as illustrating use of one method and means of the invention for economically untilizing the improved laminated sheeting 10 of FIGS. 1 and 2, as for repairing an eroded pillar or post 14, such as a pier, bridge, or other support which has become eroded or eaten away, as indicated at E, by continuous action of water.

For this purpose, laminated porous sheeting 10 cut to requisite sizes and shapes to suit, is formed and assembled into a cage-like matrix 13, and suitably secured between spaced, undamaged parts of the post 14 (as shown in FIGS. 3 and 4) to have the pre-shaped, mesh-wire backed, porous fabric layer presented inwardly as the body-forming cavity surface 15. With the rigidly formed matrix firmly affixed on post 14, pressurized fluid cement mortar, from a suitable source (not shown) is pumped or fed, through conduit 16, into the matrix cavity 17 to fill the same against the tensional restraint of the fixed matrix backing material 11. Pressure of the fluid mortar may be applied to the limit of expansion of the fabric material 12, as determined by guage and mesh size of the backing material 11 and the degree of pressure within the mortar. Requisite expansion may be visibly observed by even relatively slight bulging of the fabric within the mesh openings and/or by the operators' continuing to pump in grout until a relatively small fraction of grout within the bag oozes out through the pores of fabric layer 12 of the matrix.

Upon subsequent solidification of the resultant molded repair body, as indicated at 18 in FIG. 4, the matrix 13 may be readily removed from the repair body and the post 14. In any event, and because the inner fabric wall is firmly bonded to the wire mesh material, no preliminary manual adjustments are required to maintain the fabric in place within the matrix, as in prior methods and there is no problem of uneven expansion of the fabric layer due to wrinkles or folds in the same as in the past. Moreover, the finished repair work is accomplished with a considerable saving in labor and time, is more accurately shaped, and is 25 per cent or more stronger than previously experienced with other methods. It is readily apparent, therefore, that because of the accurately preshaped, rigid nature of the improved matrices it is possible to produce molded structures with use of fluid mortar at reduced pressures, and even without being pressurized and relying on the body weight of the fluid mortar within the matrices.

Referring now to FIGS. 5 to 8 of the drawings in general and to FIGS. 5 to 7 in particular, there is illustrated another practical use of the improved laminated material 10 for producing a cast-in-place concrete seawall W to prevent damaging wave erosion along shores of banks of waterways.

In this instance where the wall W is to be constructed on a solid foundation S at the situs, the laminate 10 may be cut and shaped to provide vertical closure walls, which may be suitably secured to staked or rods 20,20 affixed in vertical relationship to form vertical matrix enclosure walls 21 selectively to provide a well defined body-forming cavity 17a of requisite depth, width and broad lateral configuration. As before, the porous fabric layer 12 is fixedly maintained in smooth, unwrinkled condition against the mesh backing 11. For fluid sealing the matrix against the base surface 22, the matrix walls 21 may be flanged outwardly against the base surface 22. The wires 23,23 or other tension-resistent means may be extended between the laterally spaced anchor stakes 20 of the matrix walls 21, tensionally to resist outward distension of the mesh matrix backings 11, applied by internal pressure within the matrix cavity 17a in a manner to be described later.

With the composite matrix fixedly maintained as described, operators' may pump fluid, hydraulic cement mortar into the open-topped matrix 13 to fill the cavity thereof with pressurized mortar, using at least one conduit 16 initially positioned near the bottom of the matrix cavity 17a (see FIG. 5), and continuing said pumping until the cavity 17a is filled with fluid mortar F to predetermined level, as illustrated in FIG. 6. The pressure within the pumped mortar, combined with the increasing weight thereof, is effective to fill the matrix cavity without necessarily distending the fabric layer 12 beyond its given body-forming shape against the mesh layer 11. The mortar pressure can be controlled, however, to expand outwardly exposed areas of the inner layer 12 of the porous fabric into the openings of the openwork material to a desired limited extent, against said tensional restraint of the wire mesh backing 11. In any event, the pumping of mortar may be controlled to attain a desired lowering of the water-cement ratio to exude air and water from the mortar through the said outwardly exposed areas of porous fabric to a maximum efficient and effective extent, which may be manifest by oozing of mortar through the fabric pores in the areas thereof exposed (see FIGS. 4 and 6), or otherwise.

Figure 8:
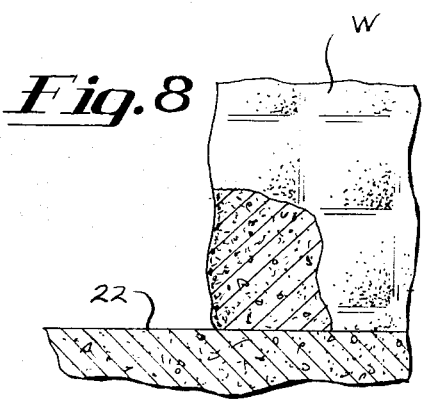
FIG. 8 is a view corresponding to FIG. 7, on the same scale, showing a portion of the formed and hardened concrete breakwater, partly broken away and in section, and after removal of the matrix from the breakwater.

The formed fluid-mortar body F is allowed progressively to set and harden into a solid wall W (see FIG. 8). When appropriate hardness has been attained in the formed concrete body W the matrix 13 may be removed, to leave the resultantly formed and hardened wall W exposed, as shown in part in FIG. 8.

Figure 9:
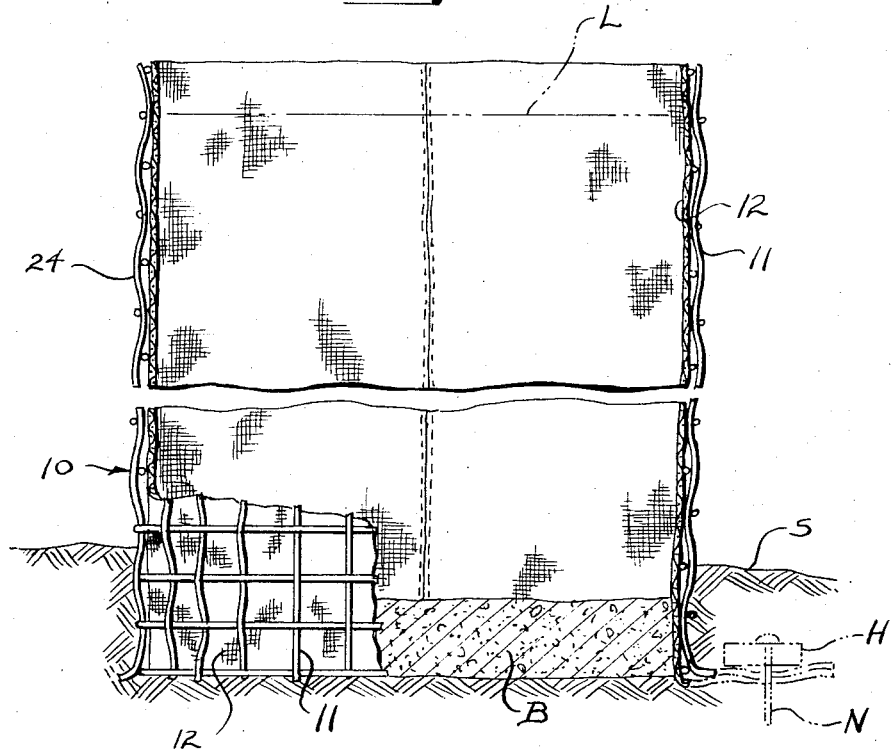
FIG. 9 is a view corresponding to FIG. 5, but on a larger scale, partly broken away and illustrating another use of the improved laminated material to form and anchor a cylindrical or other shaped column-forming matrix in situ.
Figure 10:
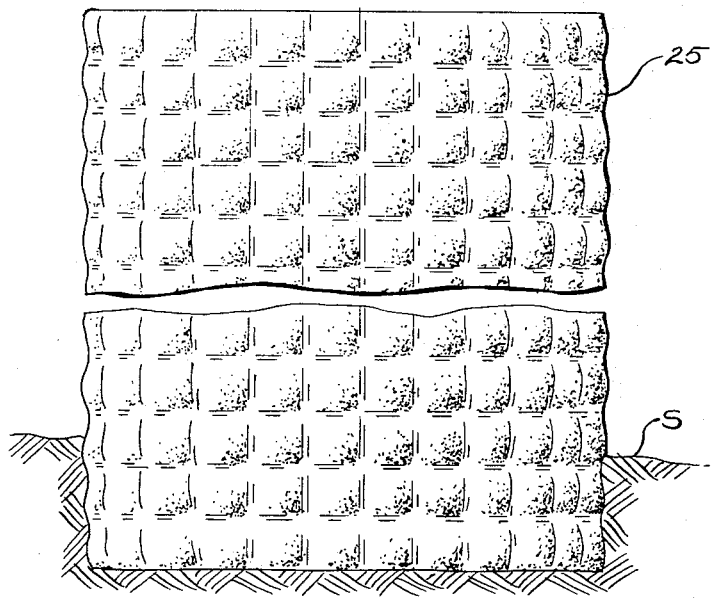
FIG. 10 is a view corresponding to FIG. 9, illustrating a concrete column as formed and hardened in the matrix shown in FIG. 9, and after removal of the matrix from the column.

FIGS. 9 and 10 correspond generally to the subject of FIGS. 5 to 8, but show use of the laminated sheeting 10 formed into a cylindrical matrix 24 utilizing a heavy mesh backing 11 therein to eliminate use of reinforcing rods. Also the matrix 24 is illustrated as being both anchored and fluid-sealed at the lower end of the matrix by sinking or positioning the same within a cavity C formed in the situs S, and packing some of the situs material into the bottom of the cavity as a fluid sealing ballast, as shown at B in FIG. 9.

After filling the matric cavity 25 with fluid mortar to a selected level L, as indicated in chain-dotted lines in FIG. 9 and allowing the mortar to harden, the matrix 24 readily may be removed to expose the finished concrete body 25, as shown in FIG. 10.

The matrix 24 can, in some circumstances, be anchored by backfilling earth of the situs S, as shown otherwise in FIG. 9, or as shown in FIG. 7, or by holding down bottom extensions of the matrix laminate with wood blocks or a suitable frame, as indicated in chain-dotted lines at H in FIG. 9, anchored by nails or spikes N driven into the situs 5.

It will be readily apparent from the foregoing that the laminated sheeting 10 of FIGS. 1 and 2 easily can be utilized to produce body forming matrices of relatively unlimited shapes, sizes and foams. As an example, the matrix 24 of the type shown in FIG. 9 could be secured about the eroded post 14 of FIGS. 3 and 4 to form a concrete repair on the same. Also a relatively small matrix of laminated material readily could be fixedly positioned in centered relation within the matrix 24 of FIG. 9, to form a hollow concrete structure for many uses, such as a pipe (not shown), having the outward appearance of the post shown in FIG. 10.

While the above described injection of the pressurized fluid cementious mortar is accomplished against strong resistence of the fixedly maintained openwork matrix, only a relatively small fraction of such fluid mortar oozes through the pores of the fabric, which is uniformly secured to the matrix, and such oozing occurs without substantial migration from the situs even where the laminated matrix sheeting 10 abuts surfaces of the situs, as shown in FIG. 9, for example. The small fraction of flowable grout which does ooze through the porous walls, in any event, finds utility in its appearance on outwardly visible surfaces, and thereby visibly indicates accomplishment of the required inflated condition of the bag means generally. Where the porous fabric walls are positioned in close proximity with material of the situs the oozed mortar will, upon normal reduction of the water-cement ratio and subsequent hardening thereof, produce a substantially improved bond between the ultimately formed concrete structure and the opposing surface portions of the situs. In this regard, it should be understood that the aforesaid reduction of the water-cement ratio initially includes expression of pressurized fluid mortar, and possibly some air, from within the matrix, and that a certain percentage of water migrates outwardly through the porous fabric and the oozed out mortar. As the water-cement reduction phenomena continues, hardening of the mortar mix within the matrix continues, with a certain amount of water retained in the mix, until the resultant concrete body sets and hardens into a solid, molded structure of predetermined shape and proportions.

Other modifications of the invention may be resorted to without departing from the spirit thereof or the scope of the appended claims.

What is claimed is:

1. Apparatus for molding a cast-in-place concrete or like structural body in a subaqueous or other situs, from self-hardenable fluid cementitious material, comprising: a matrix having body-forming cavity walls of given shape, and at least in part defined by pre-shaped laminated sheeting, said laminated sheeting including a relatively rigid backing of openwork sheet material adapted to be fixedly retained in the situs to maintain the cavity walls in given shape thereof, and a layer of porous fabric bonded to said backing on the cavity side of said backing to have porous areas of the fabric exposed outwardly through the openings of the backing substantially without blocking the pores of said exposed porous areas; said bonded porous fabric, and rigid backing of openwork sheet material thereby being adapted to retain said given cavity wall shape against internal pressure of fluid cementitious material supplied within the body-forming cavity for forming the structural body of said given shape of said cavity walls.

2. Apparatus as in claim 1, said openwork material being wire mesh material with said porous fabric tenaceously bonded thereto around said exposed porous areas.

3. Apparatus as in claim 1, said openwork material being wire-mesh material with said porous fabric tenaceously bonded thereto.

4. Apparatus as in claim 1, said openwork material being of square-mesh wire material with the porous fabric adhesively bonded thereto at a multiplicity of spaced points.

* * * * *